3,192,213
AMINOALKYL ANILIDES
John Krapcho, Somerset, N.J., assignor to Olin Mathieson
  Chemical Corporation, New York, N.Y., a corporation
  of Virginia
No Drawing. Filed Oct. 12, 1962, Ser. No. 230,270
  6 Claims. (Cl. 260—253)

This invention relates to bases of the formula (I) 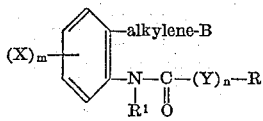

and to acid addition salts and quaternary ammonium salts thereof.

The symbols in Formula I have the following meanings:

B represents a basic nitrogen containing radical of less than 12 carbon atoms;
R represents hydrogen, lower alkyl, cycloalkyl, $(X)_m$-phenyl, furyl, thienyl, pyridyl and piperonyl;
$R^1$ represents hydrogen, lower alkyl, lower alkenyl, $(X)_m$-phenyl-lower alkylene and $(X)_m$-phenyl-lower alkenylene;
X represents hydrogen, halo, lower alkyl, lower alkoxy, hydroxy, lower alkanoyl, trihalomethyl, nitro, amino, and dialkylamino;
Y represents lower alkylene, lower alkenylene, lower alkynylene and lower alkadienylene;
$m$ represents 1, 2 and 3; and
$n$ represents 0 and 1.

The lower alkyl groups represented by R, $R^1$ and X include straight and branched chain saturated aliphatic groups such as methyl, ethyl, propyl, isopropyl, butyl, isobutyl, t-butyl, amyl, isoamyl, hexyl and the like. Methyl and ethyl are preferred. The lower alkoxy groups contain alkyl groups of the same character attached to the oxygen atom. Similarly, the lower alkylene groups represented by Y are divalent radicals of the same kind. The term "alkylene" includes such straight and branched chain aliphatic groups having up to about 14 carbon atoms, but lower alkylene groups are preferred. The lower alkenyl groups represented by $R^1$ are monounsaturated groups corresponding to the lower alkyl groups and include, for example, allyl, propenyl, isopropenyl, butenyl, isobutenyl and the like.

The unsaturated groups represented by Y are divalent straight or branched chain groups containing one carbon to carbon double bond (lower alkenylene), two carbon to carbon double bonds or one carbon to carbon triple bond (lower alkynylene) illustrated by the following:

—CH=CH—, —CH₂—CH=CH—, —CH₂—CH=CH—CH₂—

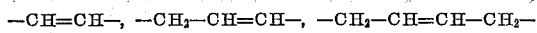
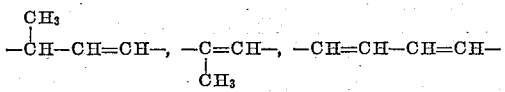

—CH=CH—CH₂—CH=CH—, —C≡C—, —CH₂—C≡C— and the like.

Each of the four halogens is contemplated by the terms "halo" and "trihalomethyl," but in the case of the halogens themselves chlorine and bromine are preferred while trifluoromethyl is the preferred trihalomethyl group.

The lower alkanoyl groups represented by X are the acyl moieties derived from lower fatty acids containing alkyl groups of the character described above and include, for example, acetyl, propionyl, butyryl and the like.

The cycloalkyl groups represented by R are saturated alicyclic groups containing preferably 3 to 7 carbon atoms including for example, cyclopropyl, cyclobutyl, cyclopentyl, cyclohexyl and cycloheptyl.

R represents a phenyl group or a phenyl group which contains one to three substituents represented by the symbol X. Illustrative of the substituted phenyl groups are the following: o-, m- and p-chlorophenyl, o-, m- and p-bromophenyl, o-, m- and p-nitrophenyl, 3,4-dinitrophenyl, 2,5-dichlorophenyl, 2,3-dibromophenyl, 3,4-dichlorophenyl, o-, m- and p-tolyl, o-, m- and p-xylyl, mesityl, p-methoxyphenyl, p-ethoxyphenyl, p-acetylphenyl, o-, m- and p-trifluoromethylphenyl, o-, m- and p-trichloromethylphenyl, 3,4-di(trifluoromethyl)phenyl, p-hydroxyphenyl, m-aminophenyl and o-dimethylaminophenyl, and the like.

$R^1$ represents $(X)_m$-phenyl-lower alkylene and $(X)_m$-phenyl-lower alkenylene wherein $(X)_m$-phenyl-lower alkylene and lower alkenylene are the same as described above and this includes for example, benzyl, phenethyl, nitrobenzyl, chlorobenzyl, bromobenzyl, dichlorobenzyl, methylbenzyl, cinnamyl, 4-chlorocinnamyl and the like.

The basic nitrogen containing radicals symbolized by B may be represented by the formula (II) 

wherein each $R^2$ represents hydrogen, lower alkyl, hydroxy-lower alkyl, phenyl-lower alkyl and N-(lower alkyl) phenyl (lower alkyl), forming such basic group as amino, lower alkylamino e.g. methylamino, ethylamino, di(lower alkyl) amino, e.g. dimethylamino, diethylamino, dipropylamino, (hydroxy-lower alkyl)amino, e.g. hydroxy-ethylamino, di(hydroxy-lower alkyl)amino, e.g. di(hydroxyethyl)amino, phenyl (lower alkyl)amino, e.g. benzylamino, phenethylamino, N-(lower alkyl)-phenyl(lower alkyl)amino, e.g. N-methylbenzylamino, and the like.

In addition the nitrogen may join with the groups represented by $R^2$ to form a 5 to 7 membered monocyclic heterocyclic containing, if desired, an oxygen, sulfur or an additional nitrogen atom (not more than two hetero atoms altogether), that is, the two symbols $R^2$ represent together tetramethylene, pentamethylene, hexamethylene, oxapentamethylene, oxatetramethylene, azahexamethylene, azatetramethylene, azapentamethylene, thiapentamethylene or thiatetramethylene. The heterocyclic group may also be substituted by one or two groups represented by X.

Thus heterocyclic groups represented by B include, for example, piperidino, (lower alkyl)piperidino, e.g. methylpiperidino, di-(lower alkyl)piperidino, e.g. dimethylpiperidino, (lower alkoxy)piperidino, e.g. methoxypiperidino, 2-, 3- or 4-piperidyl, 2-, 3- or 4-(N-lower alkylpiperidyl), e.g. 2-, 3- or 4-(N-methylpiperidyl), pyrrolidino, (lower alkyl-pyrrolidino, e.g. methylpyrrolidino, di-(lower alkyl)-pyrrolidino, e.g. dimethylpyrrolidino, (lower alkoxy)pyrrolidino, e.g. ethoxypyrrolidino, 2- or 3-pyrrolidyl, 2- or 3-(N-lower alkylpyrrolidyl), e.g. 2- or 3-(N-methylpyrrolidyl)morpholino, (lower alkyl)morpholino, e.g. N-methylmorpholino or 2-methylmorpholino, di-(lower alkyl)morpholino, e.g. 2,3-dimethylmorpholino, (lower alkoxy)morpholino, e.g. ethoxymorpholino, thiamorpholino, (lower alkyl)thiamorpholino, e.g. N - methylthiamorpholino or 2-methylthiamorpholino, di-(lower alkyl)-thiamorpholino, e.g. 2,3-dimethylthiamorpholino, (lower alkoxy)thiamorpholino, e.g. 2-methoxythiamorpholino, piperazino, (lower alkyl)piperazino, e.g. 3-methylpiperazino, 2-methylpiperazino, 2-ethylpiperazino or $N^4$-methylpiperazino, di(lower alkyl)piperazino, e.g. 2,3-dimethylpiperazino, hexamethyleneimino and homopiperazino.

The preferred members of the class defined by Formula I are those wherein X is hydrogen and Y is lower alkylene or lower alkenylene, especially the latter and particularly with 2 or 3 carbon atoms, R is phenyl, $R^1$ is hydrogen or lower alkyl, especially lower alkyl and methyl in particular, and B is di-lower alkylamino, N-(lower alkyl)-phenyl(lower alkyl)amino, oxytetramethylene, or (lower alkyl)piperazino, especially dimethylamino, N-phenethyl-N-methylamino, morpholino or 4-methylpiperazino, $m$ represents 1, $n$ represents 1 and the alkylene group has 2 or 3 carbon atoms, especially 2.

The compounds of Formula I may be produced by reacting an o-nitrophenyl alkyl halide of the formula (III) 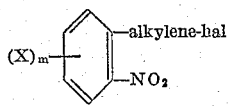

with an amine of the formula (IV) 

which forms an intermediate of the formula (V) 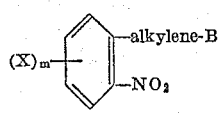

This reaction is preferably effected in an inert organic solvent such as chloroform, benzene, toluene, ether or the like at a temperature from about room temperature to reflux temperature.

The nitro group is then reduced to the amino group, e.g. by catalytically hydrogenating under pressure in the presence of a metal hydrogenation catalyst such as platinum or palladium.

The o-amino compound thus obtained is finally reacted with a compound of the formula (VI) 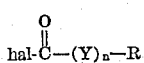

preferably in an inert organic solvent such as those described above and at room or elevated temperature up to about reflux temperature. When $n$ is 0 and R is hydrogen, chloral of formic acid is used in place of VI.

Alternatively the o-amino intermediate may be produced by reacting a nitrophenyl acyl halide of the formula (VII) 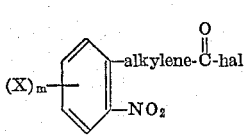

with an amine of Formula IV to obtain (VIII) 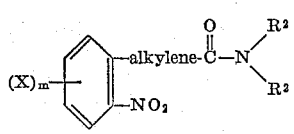

catalytically hydrogenating the nitro group to an amino group, then treating the product with a reducing agent such as lithium aluminum hydride to reduce to amino group to the amine.

The above sequence of reactions yields compounds of Formula I wherein $R^1$ is hydrogen. When $R^1$ represents other than hydrogen, the above procedure is modified as follows:

The amino compound obtained by reduction of the compound of Formula V is reacted with a acyl halide of the formula

wherein $R^3$ has the same meaning as $R^1$ excluding hydrogen, thus producing a product of the formula (IX) 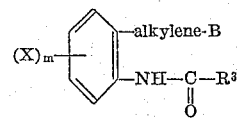

Among the suitable acyl chloride can be mentioned lower alkanoyl chloride, such as acetyl chloride, propionylchloride, butyryl chloride and hexanoyl chloride, phenyl-lower alkanoyl chloride such as benzoyl chloride, phenacetyl chloride, β-phenylpropionyl chloride and 6-phenylhexanoyl chloride, and phenyl-lower alkenoyl chlorides, such as cinnamoyl chloride, etc.

The resulting amides of Formula IX are then reduced, e.g. with lithium aluminum hydride to yield intermediates of the formula (X) 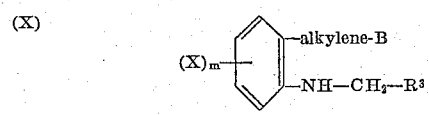

When $R^1$ represents methyl, formic acid is used instead of the acyl halide VII.

The intermediates of Formula X then are interacted with the acyl halide of Formula VI in the same manner as previously described.

The symbols are the same as in Formula I and hal refers to halogen preferably chlorine or bromine.

The bases of Formula I form acid addition salts by reaction with the common inorganic and organic acids. Such inorganic salts as hydrohalides, e.g. hydrobromide, hydrochloride, hydroiodide, sulfates, nitrates, phosphates, borates, etc., and organic salts as acetate, oxalate, tartrate, malate, citrate, succinate, benzoate, ascorbate, salicylate, theophyllinate, camphorsulfonate, alkanesulphonate, e.g. methanesulfonate, arylsulfonate, e.g. benzenesulfonate, toluenesulfonate, and the like are also within the scope of the invention. It is frequently convenient to effect the purification of the product by forming the acid salt. The base may be obtained therefrom by neutralization with an alkali hydroxide such as sodium hydroxide.

The bases of Formula I also form quaternary ammonium salts, e.g. lower alkyl halides such as methyl chloride, methyl bromide, ethyl chloride, etc., lower alkyl sulfates such as methyl sulfate, ethyl sulfate, etc., monocyclic aryl (lower alkyl)halides and sulfates such as benzyl chloride, benzyl sulfate, etc. This is accomplished by reacting the base with the alkyl halide, sulfate, or the like.

The compounds of this invention are therapeutically active substances which possess serotonin inhibitory and hypotensive activities. They are useful in the treatment of a condition such as hypertension. They may be administered orally or parenterally in the form of tablets, capsules, elixirs, injectables or the like by incorporating the appropriate dosage of the base of Formula I or a physiologically acceptable acid addition salt or quaternary ammonium salt thereof in a conventional vehicle according to accepted pharmaceutical practice.

The following examples are illustrative of the invention. All temperatures are expressed on the centigrade scale.

EXAMPLE 1

*2'-(2-dimethylaminoethyl)cinnamanilide hydrochloride*

(A) PREPARATION OF 2'-(2-DIMETHYLAMINOETHYL) NITROBENZENE

To a cold solution of 200 ml. of 40% aqueous dimethylamine is added 38.5 g. of o-nitrophenethyl bromide (J.A.C.S. 62, 1436, 1940), and then 50 ml. of ethanol. The mixture is stirred at room temperature for one hour, heated at 70–75° for five hours, cooled and treated with 100 g. of sodium hydroxide pellets. The product is extracted three times with 300 ml. of ether and dried over magnesium sulfate. After evaporation of the solvent the residue is fractionated to give 26 g. of liquid; B.P. about 100–105° (0.5 mm.).

(B) PREPARATION OF 2'-(2-DIMETHYLAMINOETHYL) ANILINE

A solution of 24.1 g. of material from part (A) in 100 ml. of ethanol is treated with a suspension of 5 g. of 5% palladium-carbon in 50 ml. of ethanol and the mixture placed under three atmospheres of hydrogen. After the hydrogen consumption stops, the mixture is filtered and the solvent evaporated. Fractionation of the residue gives 15.5 g. of colorless product; B.P. about 90–95° (0.3 mm.).

Alternatively this material is prepared by reaction of o-nitrophenacetyl chloride with two equivalents of dimethyl amine to give N,N-dimethyl-o-nitrophenacetamide. Hydrogenation of this material in the presence of palladium carbon catalyst gives N,N-dimethyl-o-aminophenacetamide. The addition of this material to a slurry of an equivalent quantity of lithium aluminum hydride in tertahydrofuran or ether yields 2'-(2-dimethylaminoethyl) aniline.

(C) PREPARATION OF 2'-(2-DIMETHYLAMINOETHYL) CINNAMANILIDE HYDROCHLORIDE

A solution of 12.0 g. of the material from part (B) in 100 ml. of chloroform is added dropwise to a cold solution of 12.2 g. of freshly distilled cinnamoyl chloride in 50 ml. of chloroform. The mixture is stirred at room temperature for one hour and then refluxed for thirty minutes. After cooling to room temperature, the mixture is filtered and the filtrate diluted to 500 ml. with ether. The colorless product weighs 15.5 g., M.P. 174–183°. After two crystallizations from 200 ml. portions of acetonitrile, the material melts at 189–191°. Neutralization with excess sodium hydroxide gives the free base.

EXAMPLE 2

2'-(3-dimethylaminopropyl)cinnamanilide hydrochloride

By substituting 39 g. of 3-(o-nitrophenyl)propyl bromide (J.C.S. 1955, 894) for the o-nitrophenethyl bromide and following the procedure of Example 1, 2'-(3-dimethylaminopropyl)cinnamanilide hydrochloride is obtained.

EXAMPLE 3

2'-(2-morpholinoethyl)cinnamanilide hydrochloride

By substitution of an equivalent quantity of morpholine for dimethylamine in Example 1, 2'-(2-morpholinoethyl)cinnamanilide is obtained.

EXAMPLE 4

2'[2-(N-methyl-N-benzylamino)ethyl]cinnamanilide hydrochloride

By substitution of an equivalent quantity of N-methylbenzylamine for the dimethylamine in Example 1, 2'[2-(N-methyl-N-benzylamino)ethyl]cinamanilide hydrochloride is obtained.

EXAMPLE 5

2'[3-(1-methyl-4-piperazinyl)propyl]cinnamanilide hydrochloride

By substituting an equivalent quantity of N-methylpiperazine for dimethylamine in Example 2, 2'[3-(methyl-4-piperazinyl)propyl]cinnamanilide hydrochloride is obtained.

EXAMPLE 6

2'(2-dimethylaminoethyl)-4-methoxycinnamanilide hydrochloride

By substituting an equivalent quantity of 4-methoxy-2-nitrophenethyl bromide for the o-nitrophenethyl bromide in Example 1, 2'(2-dimethylaminoethyl)-4-methoxycinnamanilide hydrochloride is obtained.

EXAMPLE 7

2'(2-dimethylaminoethyl)acetanilide hydrochloride

By substitution of an equivalent quantity of acetyl chloride for cinnamoyl chloride in Example 1, 2'-(2-dimethylaminoethyl) acetanilide hydrochloride is obtained.

EXAMPLE 8

2'-(2-dimethylaminoethyl)benzanilide hydrochloride

By substituting an equivalent quantity of benzoyl chloride for cinnamoyl chloride in Example 1, 2'(2-dimethylaminoethyl)benzanilide hydrochloride is obtained.

EXAMPLE 9

2'(2-dimethylaminoethyl)hexahydrobenzanilide hydrochloride

By substituting an equivalent quantity of hexahydrobenzoyl chloride for cinnamoyl chloride in Example 1, 2'-(2-dimethylaminoethyl)hexahydrobenzanilide hydrochloride is obtained.

EXAMPLE 10

2'-(2-dimethylaminoethyl)sorbanilide hydrochloride

By substituting an equivalent quantity of sorboyl chloride for cinnamoyl chloride in Example 1, 2'-(2-dimethylaminoethyl)sorbanilide hydrochloride is obtained.

EXAMPLE 11

2'-(2-dimethylaminoethyl)phenylpropiolylanilide hydrochloride

By substituting an equivalent quantity of phenylpropiolyl chloride for cinnamoyl chloride in Example 1, 2'-(2-dimethylaminoethyl)phenylpropiolylanilide hydrochloride is obtained.

EXAMPLE 12

2'(2-dimethylaminoethyl)phenacetanilide hydrochloride

Following the procedure of Example 1, but substituting an equivalent quantity of phenacetyl chloride for cinnamoyl chloride, 2'-(2 - dimethylaminoethyl)phenacetanilide hydrochloride is obtained.

EXAMPLE 13

2'-(2-dimethylaminoethyl)furanilide hydrochloride

Following the procedure of Example 1, but substituting an equivalent amount of furoyl chloride for cinnamoyl chloride, 2'-(2-dimethylaminoethyl)furanilide hydrochloride is obtained.

EXAMPLE 14

2'(2-dimethylaminoethyl)-α-methylcinnamanilide hydrochloride

Following the procedure of Example 1, but substituting an equivalent amount of α-methylcinnamoyl chloride for cinnamoyl chloride, 2'-(2-dimethylaminoethyl)-α-methylcinnamanilide hydrochloride is obtained.

EXAMPLE 15

2'-(2-dimethylaminoethyl)-3,4,5-trimethoxybenzanilide hydrochloride

Following the procedure of Example 1, but substituting an equivalent amount of 3,4,5-trimethoxybenzoyl chloride for cinnamoyl chloride, 2'-(2-dimethylaminoethyl)-3,4,5-trimethoxybenzanilide hydrochloride is obtained.

EXAMPLE 16

2-chloro-2'-(2-dimethylaminoethyl)cinnamanilide hydrochloride

By substituting an equivalent amount of o-chlorocinnamoyl chloride for cinnamoyl chloride in Example 1, 2-chloro-2'-(2-dimethylaminoethyl)cinnamanilide hydrochloride is obtained.

EXAMPLE 17

*2,4-dichloro-2'-(2-dimethylaminoethyl)cinnamanilide hydrochloride*

By substituting an equivalent amount of 2,4-dichlorocinnamoyl chloride for the cinnamoyl chloride in Example 1, 2,4-dichloro-2'-(2-dimethylaminoethyl)cinnamanilide hydrochloride is obtained.

EXAMPLE 18

*N-benzyl-2'-(2-dimethylaminoethyl)aniline*

A solution of 30.4 g. of material from Example 8 in 100 ml. of water is treated with a solution of 4 g. of sodium hydroxide in 20 ml. of water. The free base is extracted with 300 ml. portions of ether and the combined extracts dried over magnesium sulfate. The mixture is filtered and the filtrate added dropwise to a stirred slurry of 5 g. of lithium aluminum hydride in 300 ml. of ether. After stirring overnight at room temperature, the mixture is cooled and treated dropwise with a solution of 2 g. of sodium hydroxide in 20 ml. of water. After stirring at room temperature for one hour, the mixture is filtered and the filtrate dried over magnesium sulfate. The mixture is filtered and the solvent evaporated to give N-benzyl-2'-(2-dimethylaminoethyl)aniline.

EXAMPLE 19

*N-benzyl-2'-(2-dimethylaminoethyl)cinnamanilide hydrochloride*

A solution of 25.0 g. of material from Example 18 in 100 ml. of chloroform is added dropwise to a solution of 17.0 g. of cinnamoyl chloride in 200 ml. of chloroform. The mixture is refluxed for one hour, cooled and diluted to 800 ml. with ether to give N-benzyl-2'-(2-dimethylaminoethyl)cinnamanilide hydrochloride.

EXAMPLE 20

*2'-(2-dimethylaminoethyl)cinnamanilide methochloride*

A solution of 11 g. of material from part C of Example 1 in 50 ml. of water is treated with a solution of 1 g. of sodium hydroxide in 5 ml. of water. The liberated base is extracted with 100 ml. portions of ether and the combined ether extracts are dried over magnesium sulfate. The mixture is filtered and the solvent evaporated from the filtrate. The residue is dissolved in 50 ml. of acetonitrile, cooled and treated with 15 g. of methyl chloride. After standing for a day at room temperature, the solution is diluted to 500 ml. with ether to give 2'-(2-dimethylaminoethyl)cinnamanilide methochloride.

What is claimed is:

1. A compound of the group consisting of a base of the formula wherein
the alkylene group has up to 14 carbon atoms, R represents a member of the group consisting of hydrogen, lower alkyl, cycloalkyl of 3 to 7 carbon atoms, $(X)_m$-phenyl, furyl, thienyl, pyridyl and piperonyl, $R^1$ represents a member of the group consisting of hydrogen, lower alkyl, lower alkenyl, $(X)_m$-phenyl-lower alkylene and $(X)_m$-phenyl-lower alkenylene, X represents a member of the group consisting of hydrogen, halo, lower alkyl, lower alkoxy, hydroxy, lower alkanoyl, trihalomethyl, nitro, amino and di-lower alkylamino, Y represents a member of the group consisting of the group of lower alkenylene, lower alkynylene and lower alkadienylene, B represents a basic, nitrogen containing radical of the group consisting of $$N\begin{matrix}R^2\\R^2\end{matrix}$$

and N-hetero-$(X)_p$, wherein $R^2$ is a member of the group consisting of hydrogen, lower alkyl, hydroxy-lower alkyl, phenyl-lower alkyl and N-(lower alkyl)phenyl(lower alkyl), hetero is a divalent radical of the group consisting of tetramethylene, pentamethylene, hexamethylene, oxapentamethylene, oxatetramethylene, azahexamethylene, azatetramethylene, azapentamethylene, thiapentamethylene and thiatetramethylene, X has the same meaning as previously defined and p is an integer from 0 to 2, m represents an integer from 1 to 3, and n represents 1,
and physiologically acceptable acid addition salts and quaternary ammonium salts of said base.

2. A compound of the formula

3. A physiologically acceptable acid addition salt of a compound of claim 2.
4. 2'-(2-dimethylaminoethyl)cinnamanilide.
5. 2'-(3-dimethylaminopropyl)cinnamanilide.
6. 2'-(2-dimethylaminoethyl)-α-methylcinnamanilide.

References Cited by the Examiner

UNITED STATES PATENTS 2,852,556   9/58   Katz et al. _____ 260—558 XR
3,043,676   7/62   Lemin _____ 260—558 XR

FOREIGN PATENTS 210,170   10/55   Australia.

OTHER REFERENCES

Braun et al.: Chemische Berichte, vol. 57B, pages 913–4 (1924).

Hall: Jour. Chem. Soc. (London), pages 694–9 (1945).

IRVING MARCUS, *Primary Examiner.*

DUVAL T. McCUTCHEN, WALTER A. MODANCE, *Examiners.*